United States Patent
Knäbel (10) Patent No.: US 9,719,767 B2
(45) Date of Patent: Aug. 1, 2017

(54) DEVICE FOR INSPECTING A PROFILED WORKPIECE

(71) Applicant: Horst Knäbel, Meerbusch (DE)

(72) Inventor: Horst Knäbel, Meerbusch (DE)

( * ) Notice: Subject to any disclaimer, the term of this patent is extended or adjusted under 35 U.S.C. 154(b) by 69 days.

(21) Appl. No.: 14/647,016

(22) PCT Filed: Nov. 21, 2013

(86) PCT No.: PCT/EP2013/003513
§ 371 (c)(1),
(2) Date: May 22, 2015

(87) PCT Pub. No.: WO2014/082720
PCT Pub. Date: Jun. 5, 2014

(65) Prior Publication Data
US 2015/0285610 A1    Oct. 8, 2015

(30) Foreign Application Priority Data

Nov. 27, 2012   (DE) .................... 20 2012 011 329 U
Dec. 7, 2012    (DE) .................... 20 2012 011 761 U
(Continued)

(51) Int. Cl.
G01B 5/20     (2006.01)
G01B 5/24     (2006.01)
G01M 13/02    (2006.01)

(52) U.S. Cl.
CPC .............. *G01B 5/202* (2013.01); *G01B 5/20* (2013.01); *G01B 5/24* (2013.01); *G01M 13/023* (2013.01)

(58) Field of Classification Search
CPC  G01B 5/202; G01B 5/20; G01B 5/24; G01M 13/023
(Continued)

(56) References Cited

U.S. PATENT DOCUMENTS 2,992,491 A  *  7/1961  Hofler ...................... G01B 7/28
                                                    33/501.9
3,631,603 A  *  1/1972  Munro ...................... B65D 5/54
                                                    33/501.9
(Continued)

FOREIGN PATENT DOCUMENTS

DE        14 23 570 A1      1/1969
DE        10 2004 058657 A1 6/2006
JP        S53-110555 A      9/1978

OTHER PUBLICATIONS

International Search Report for corresponding International Patent Application PCT/EP2013/003513 mailed Mar. 4, 2014.

*Primary Examiner* — G. Bradley Bennett
(74) *Attorney, Agent, or Firm* — Merchant & Gould P.C.

(57) ABSTRACT

A device for inspecting a profiled work pieces has a toothing, the profile metrologically detectable by the probe element of a profile probe. The profile and the profile probe are moved relative to one another and at right angles or tangentially to the measuring plane of the profile probe. The device measures work pieces having different numbers of teeth, modules and widths, directly after processing, on site and quickly, for accuracy and deviations, without special profiles for the toothing. The probe element of the profile probe can be applied to the profile of the work piece, can be applied to the profile edge of the work piece that is moving away from the probe element by the probe radius of the probe element, and subsequently, by the lateral surface of the probe element facing the profile edge opposite thereof, is configured so the probe element can be displaced from the profile gap.

10 Claims, 7 Drawing Sheets

(30) Foreign Application Priority Data

Jan. 10, 2013 (DE) .................... 20 2013 000 212 U
Aug. 21, 2013 (DE) .................... 20 2013 007 500 U (58) Field of Classification Search
USPC .............................. 33/501.9, 501.14–501.18
See application file for complete search history.

(56) References Cited

U.S. PATENT DOCUMENTS

| | | | | |
|---|---|---|---|---|
| 3,757,425 | A * | 9/1973 | Bouillon | G01B 7/28 |
| | | | | 33/501.18 |
| 4,519,241 | A * | 5/1985 | Hofler | G01B 7/283 |
| | | | | 33/501.9 |
| 4,519,242 | A * | 5/1985 | Hofler | G01B 5/202 |
| | | | | 33/501.9 |
| 4,610,091 | A * | 9/1986 | Bertz | G01B 7/283 |
| | | | | 33/501.15 |
| 4,926,559 | A * | 5/1990 | Knabel | G01B 5/012 |
| | | | | 33/556 |
| 4,962,590 | A * | 10/1990 | Ambrose | G01M 13/021 |
| | | | | 33/501.14 |
| 5,461,797 | A | 10/1995 | Royer et al. | |
| 7,716,844 | B2 | 5/2010 | Pommer | |
| 2005/0166413 | A1* | 8/2005 | Crampton | B25J 13/088 |
| | | | | 33/503 |
| 2011/0179659 | A1* | 7/2011 | Yuzaki | G01B 5/202 |
| | | | | 33/501.9 |
| 2015/0338201 | A1* | 11/2015 | Wuerfel | G01B 5/24 |
| | | | | 700/160 |

\* cited by examiner

DEVICE FOR INSPECTING A PROFILED WORKPIECE

This application is a National Stage Application of PCT/EP2013/003513, filed 21 Nov. 2013, which claims benefit of Serial No. 20 2012 011 329.1, filed 27 Nov. 2012 in Germany, Serial No. 20 2012 011 761.0, filed 7 Dec. 2012 in Germany, Serial No. 20 2013 000 212.3, filed 10 Jan. 2013 in Germany and Serial No. 20 2013 007 500.7, filed 21 Aug. 2013 in Germany and which applications are incorporated herein by reference. To the extent appropriate, a claim of priority is made to each of the above disclosed applications.

DESCRIPTION BACKGROUND OF THE INVENTION

The invention relates to a device for inspecting a profiled workpiece, in particular a profiled workpiece having a toothing, the profile of which can be metrologically detected by a profile probe, wherein the profile and the profile probe can be moved relative to one another and at right angles or tangentially to the measuring plane of the profile probe.

There are numerous cases in which a straight, oblique, herringbone or spiral toothed spur, bevel, crown, worm, ring and sprocket gear, but also a toothed rod, toothed shaft as well as a shaft or hub with splines have to be measured, if possible on site, that is to say during manufacture, for their dimensional stability, deviation of profile shape, deviation of profile angle, profile waviness and the like, as well as the course of the profile relative to a reference axis or reference plane. The most varied measuring devices are known for this purpose. Only a small part of these measuring tasks can be accomplished by manually operated and cost-effective measuring devices. So-called measuring machines have the disadvantage that they have an extremely complex structure, often relying on mating gears or master gears, require a relatively large amount of time for measurements to be carried out, cannot generally be used on site during manufacture and are expensive.

SUMMARY OF THE INVENTION

Therefore the object of the invention is to provide a device which is cost-effective, of simple construction, and very universally usable, and by means of which device such workpieces having different dimensions, that is, different numbers of teeth, modules and widths, can be measured, directly after the processing thereof, on site and in the shortest amount of time, for their dimensional accuracy on the one hand, and for deviations in shape and position on the other hand, without having to rely on special counter-profiles or profile elements specifically for the toothing to be checked. Furthermore with such a device it should also be possible for example to measure the toothing of gears, toothed rods and other toothed components in a plurality of planes, the profile of multiple sprockets and other multi-track components in all tracks, but also transmission shafts with a plurality of different toothings with any spacings and any number of planes simultaneously and completely independently of one another, in order also to be able to guarantee 100% checking even with a short machine cycle time.

In order to achieve this object, according to the invention in a device of the generic type described in the introduction, it is proposed that the probe element (8e, 9e, 105) of the profile probe (8, 9, 106) which can be applied to the profile of the workpiece, can be applied to the profile edge (113) of the workpiece (1, 111) which is moving away from the probe element (8e, 9e, 105) by way of the probe radius (112), and, by way of the lateral surface (115) facing the opposing profile edge (114), is configured such that the probe element (8e, 9e, 105) can be displaced from the profile gap.

A device constructed in this way not only does not achieve the above-mentioned object, but also, when the simple but very effective probe element is used, offers the possibility of being able to detect and evaluate very slight deviations of shape with a very low probing force of for example 0.1 to 0.6 N over a very small probe radius of approximately 25 to 100 μm. Furthermore the possibility exists of assigning the probe element to a distance piece which is connected by means of a linear guide to a main body and is coupled to the profile probe so that an autonomous, versatile measuring unit is produced.

BRIEF DESCRIPTION OF THE DRAWINGS

The invention as well as further features and advantages thereof are explained in greater detail below with reference to embodiments illustrated in the drawings.

In the drawings.

DETAILED DESCRIPTION OF THE PREFERRED EMBODIMENTS

Figure 1:
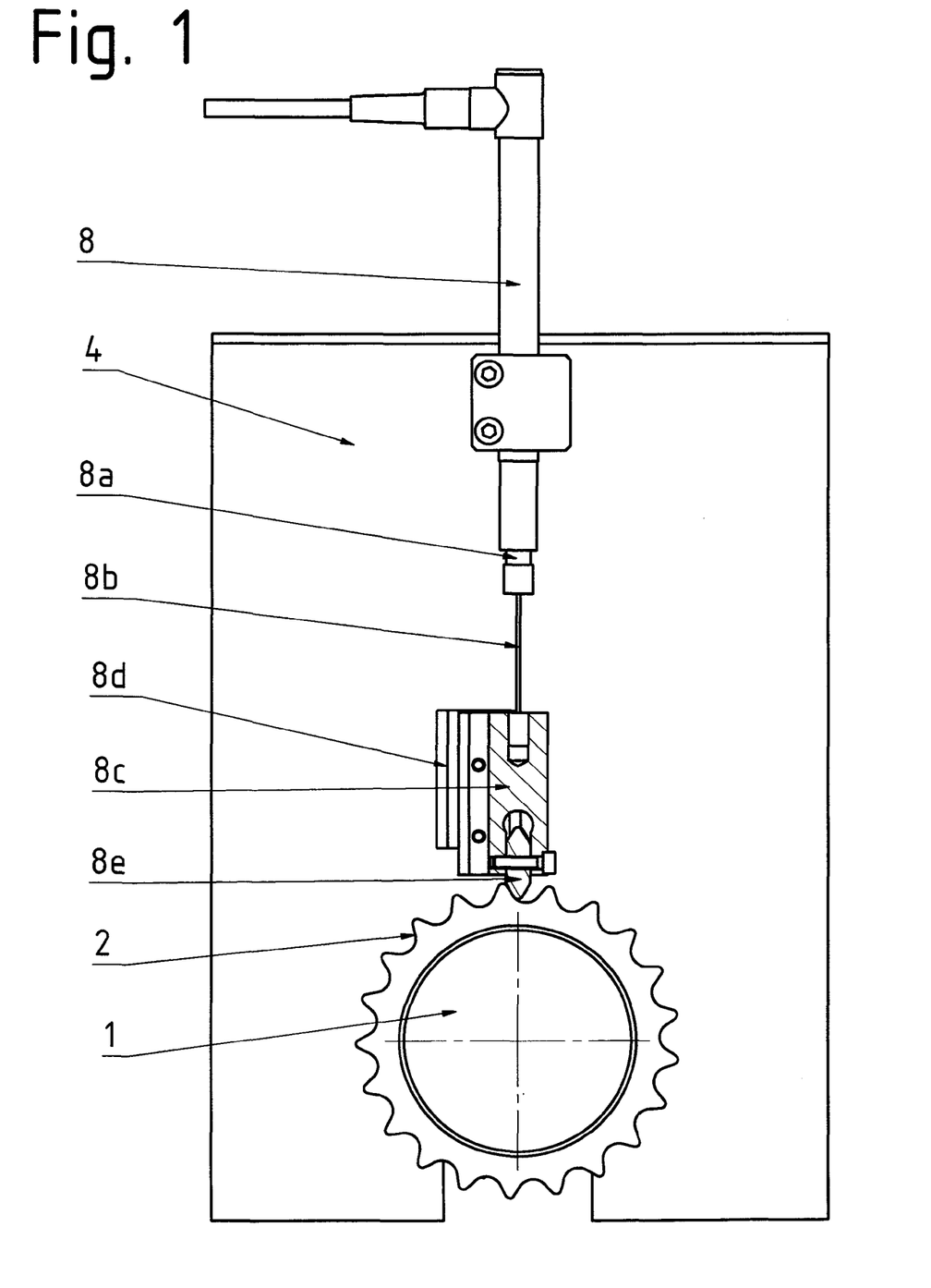
FIG. 1 shows a simple representation of a device according to the invention for measurement of a sprocket, FIG. 2 and FIG. 3 each show a detail of a device for measuring a gear in two chronologically following steps.

FIG. 1 of the drawings shows a device according to the invention during the measurement of the sprocket toothing 2 of a shaft 1. In a manner which is known per se, this shaft 1 is mounted coaxially in a receptacle (not shown) between tips or on roller prisms and is driven by a drive (also not shown). An angle measuring device which is known per se and also not shown, but is connected to the shaft 1 can detect the rotary movement of the shaft 1. In this embodiment the probe element 8e of a profile probe 8 is constructed as a bilaterally conical radius disc which with a predeterminable probing force bears with its outer radius on the toothing 2 of the shaft 1 and is held by a distance piece 8c which is mounted on a linear guide 8d and is connected by means of a spring rod 8d to the probe pin 8a of the profile probe 8. So-called alignment errors are elastically compensated by the connection of the distance piece 8c to the probe pin 8a by means of a spring rod 8d, but movements in the axial direction are virtually rigidly transmitted. The profile probe 8. which is connected to a measuring computer which is known per se, can be configured as an inductive or incremental length measuring probe and in this embodiment is fastened to a stator 4 of the device.

When the above-mentioned drive (not shown) turns the shaft 1, the probe element 8e slides tangentially over the toothing 2 and transmits the contour of the toothing 2 as radial movement over the components which are connected to it on the profile probe 8, which transmits its measured values, together with those of the angle measuring device, for monitoring the rotary movement of the shaft 1, to a measuring computer which is known per se but not shown. However, the probe element 8e can also be configured as a conical pin with a spherical tip. In the case of sprockets the size of the probe radius of the probe element 8e depends in particular on the size of the radius of the tooth depression, the surface quality thereof as well as the desired mechanical measured value smoothing and in contrast to that of gears is approximately 1 to 2 mm. The probing force can be applied by a spring, a weight or another medium. In this case the effective probing force can also be changed by an oblique positioning of the device or an oblique arrangement of the linear guide 8d with all the components connected to it.

If the slope of the tooth flank of the toothing 2 exceeds the angle of the conical probe element 8e of approximately 60°, the probe element 8e is lifted out of its probe position and displaced out of the tooth space. After passing over the subsequent tooth head the probe element 8e then arrives in the region of the next tooth space, is lowered smoothly into its measurement position and now detects the contour of this tooth space. In such a device designed for measurement of sprockets the shaft 1 can be rotated in any direction for measurement of the toothing 2 and only one revolution is necessary in order to measure the entire toothing 2. However, it may also be sensible to rotate the shaft 1 by 360° in both directions during the measurement and to form the mean value from both series of measurements of the toothing 2. In this way the influence of friction can be compensated to the greatest possible extent.

When a toothed shaft 1 is received in the frictional grip between two tips it is advantageous, irrespective of which tip is driven from the shaft, to allocate each tip its own angle measuring device in order, in the event of a measured value difference occurring, to recognise a slippage promptly and to be able to cancel the measurement.

Figure 2:
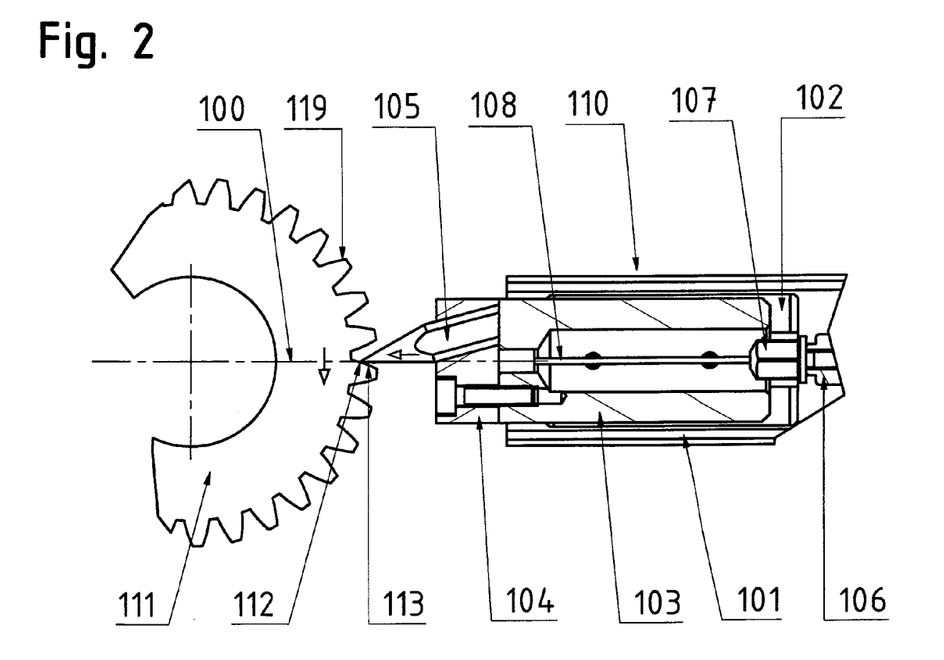
Figure 3:
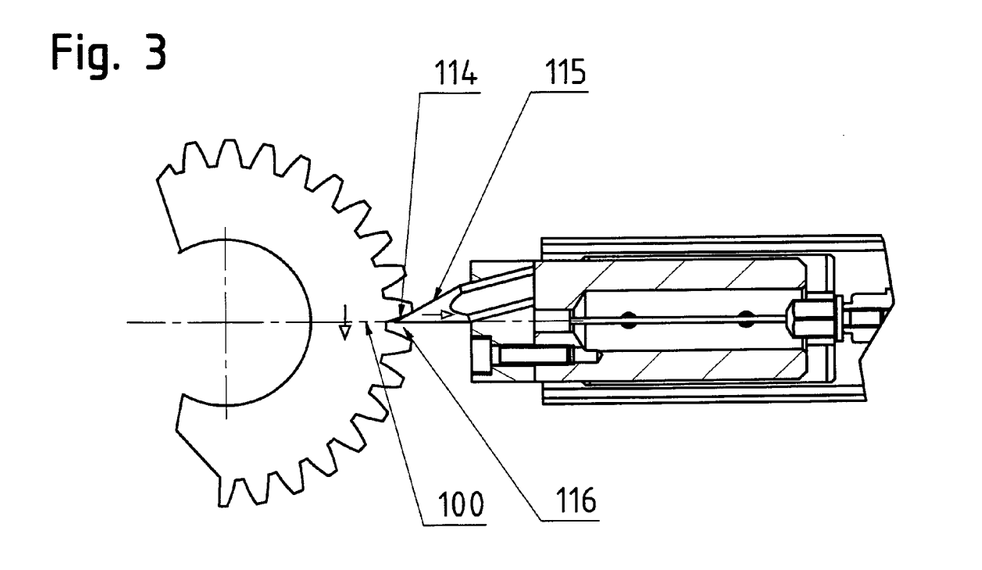

If, as is proposed according to the invention and is illustrated in FIGS. 2 and 3, on a main body 101 on the one hand a linear guide 102 is connected to a distance piece 103, a probe element support 104 as well as a probe element 105 and on the other hand the profile probe 106 is connected with its probe pin 107 by means of a spring rod 108 to the distance piece 103, an autonomous, universally usable measuring unit 110 is produced which can be seen in FIGS. 2 and 3 with the workpiece 111 illustrated as a spur gear shown here as a detail. Reference is made to FIG. 2 with regard to some reference numerals in FIG. 3.

The probe element 105, which in FIGS. 2 and 3 is formed as a conical pin with a spherical probe tip, is inclined obliquely with respect to a profile edge 114 of the workpiece 111 moving on the probe element 105, and is inserted into the probe element support 104. The spherical probe tip is provided with a probe radius 112, the centre of which lies on a measuring axis 100 which—predetermined by the direction of action of the profile probe 106—impinges perpendicularly on the axis of rotation of the profile probe 111. The probe element 105 is applied with its probe radius 112 to a tooth flank 113 which moves away, that is to say retreats, so that when the workpiece 111 rotates for example in a clockwise direction the probe element 105 slides over the tooth edge 113 and senses it from the tip circle to the root circle before the opposite edge 114 runs onto the oblique outer surface 115 of the probe element 105 and then displaces the probe element 105—driven by the workpiece 111—against the probing force out of the tooth space 116.

The probe element 105 also moves in the same way between the flanks when the workpiece 111 is a profiled rail, for example a toothed rod. However, in this case it may be advantageous if the measuring unit 110—supported by a linear guide—is moved along the workpiece 111, rather than the workpiece 111 moving past the measuring unit 110. However, this is also possible in principle.

If the toothing 2 to be measured on the workpiece 111 is a considerably undercut gear or a cycloidal toothing, it may be necessary to move the probe element 105 tangentially to the tooth system and/or in its oblique position in a corresponding manner, so that the touch point of the probe element 105 along its measuring path always bears securely against the retreating flank 113.

In such a device designed for measurement of the toothing of a gear or a toothed rod, it is advantageous to operate with a probe radius 112 from 25 to 100 μm and to dispose the probe element 105 so that its outer surface 115 at approximately 25 to 35° is oblique relative to the movement plane of the linear guide 102, wherein the angle of the conical probe element 105 for formation of a clearance angle should in any case be equal to or less than the angle between the outer surface 115 and the movement plane of the linear guide 102.

Since with such a device in each case only the edges 113 moving away relatively from the probe element 105 can be measured, it is necessary, after the first pass in one direction, to reverse the direction of the drive and to repeat the measurement in the reverse direction, after the measuring unit 110 is also turned or disposed so that now the opposite edges become the edges 113 moving away relatively from the probe element 105, in order to be able likewise to detect these edges metrologically in the same way.

There are several possibilities for such turning of the measuring unit 110. For example, for this purpose the measuring unit 110 can be rotated by 180° about its own axis, a second measuring unit 110 can be disposed in mirror image to the previous measuring unit 110 or the distance piece 103 can be equipped with two probe elements in mirror image relative to one another which can be applied alternately to the profile to be measured. However, it is also possible to rotate the probe element 105 with the probe element support 104 and the distance piece 103 exactly by 180° about the measuring axis 100. For this purpose the distance piece 103 should be rotatably supported without play and received by a housing 117 and should be coupled to a drive 118, for example a direct current geared motor.

Figure 4:
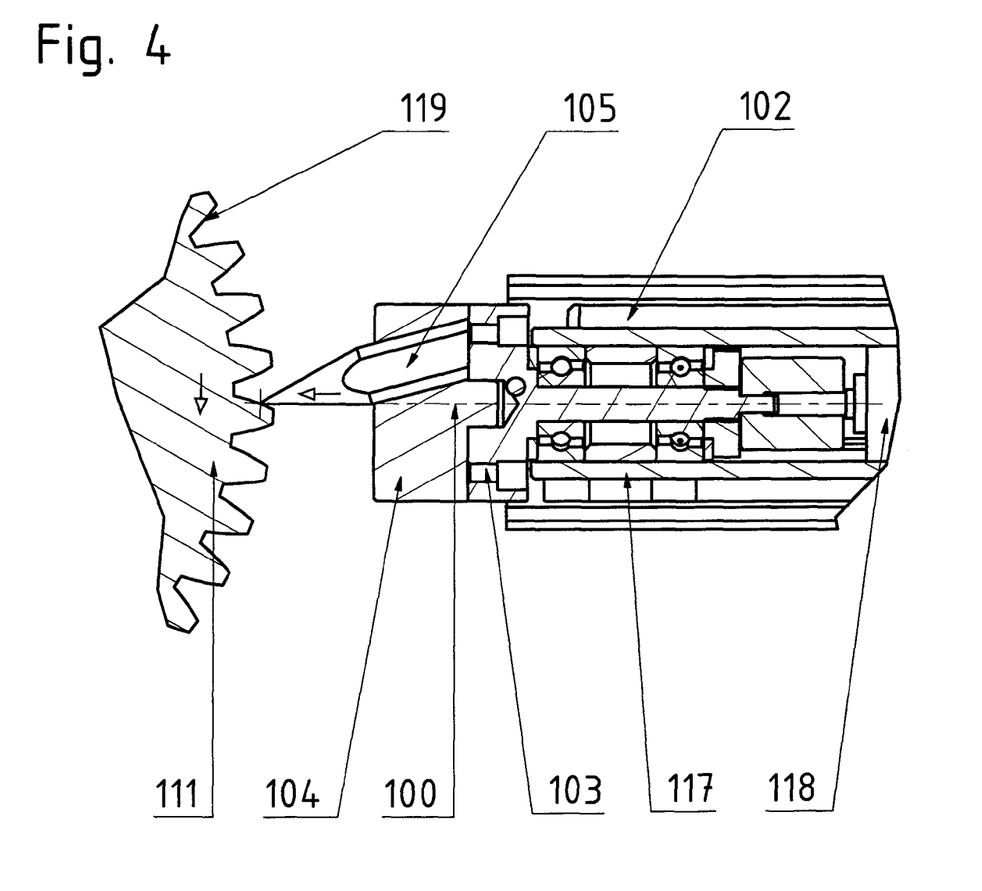
FIG. 4 shows a section through a measuring unit with a probe element constructed as a conical pin with a spherical tip and rotatable distance piece in the measurement position.

FIG. 4 shows such a measuring unit 110 with a distance piece 103 which is rotatably supported without play and is driven by a direct current geared motor, the distance piece being disposed in a housing 117 and now connected by means of the housing 117 to the linear guide 102. The possibility exists, as shown in FIG. 4, of also installing the geared motor of the drive 118 in the housing 117 or associating it with the main body 101. In the case of installation of the drive 118 in the housing 117, the drive itself must also perform the measuring movements. If the drive 118 is attached to the main body 101 a corresponding coupling, which transmits in both directions of rotation without axial fixing of the torque, is necessary between the distance piece 103 and the drive 118. A particularly advantageous embodiment of such a coupling is produced if the hubs of the coupling are connected by means of a miniaturised linear guide. With such an embodiment it is sensible if the stop for safeguarding the rotary movement of the distance piece 103 is also assigned to the distance piece 103.

The axis of rotation of the distance piece 103, which should advantageously be identical to the measuring axis 100, extends in the operating direction of the linear guide 102 through the centre point of the probe radius 112, so that the probe element 105 can detect the edges 113, which are now at the rear, in the same way. This means that the edges 114 previously at the front now become the rear edges 113 and the previously rear edges 113 become the front edges 114. In the case of rotationally symmetrical workpieces, for example gears, the measuring axis should intersect the axis of rotation. In the case of rod-shaped workpieces, for example toothed rods, the measuring axis 100 should be at right angles to the profile reference line.

If it is now required to monitor the deviation of shape or angle of the toothing 2, the series of measurements of both edges 113 and 114 can be evaluated independently of one another. However, if the usual features, such as pitch, pitch diameter etc. of the toothing 2 are also to be ascertained, both series of measurements must be referenced to one another, i.e. synchronised. This takes place in the simplest way by the addition of a so-called setting master with a symmetrical, V-shaped notch by which, before the actual measurement the profile probe(s) 106 of the measuring unit 110 or the measuring units 110 are calibrated with the external contour of the setting master and the angle measuring device at the lowest point on the notch, in order to bring the series of measurements then recorded into accord, that is to say into congruence or concordance.

A measuring unit 110 which is movable parallel to the workpiece may be used for example when the toothing 109 is to be measured over a portion or over its entire length. In such a case the possibility exists of interrupting the axial movement after each revolution of the workpiece 111, in order thus to measure the toothing 109 of the workpiece 111 plane for plane in one axial direction, and after a change of direction of rotation to measure the corresponding planes in the other axial direction or to be able to measure continuously, that is to say helically, over the entire length, in both directions taking account of the change of direction of rotation.

However, it is substantially more advantageous to dispose a plurality of measuring units 110 at different heights or spacings relative to one another along the toothing, in order thus to be able to measure the toothing simultaneously in a plurality of planes. In the case of gears the measuring units 110 can be distributed at different heights in a radiating form on the circumference, whereas in the case of toothed rods the measuring units are disposed separately from one another at different heights and if necessary also at different spacings. By means of a setting master as already mentioned the series of measurements of all measuring units 110 in use are synchronised with one another.

Figure 6:
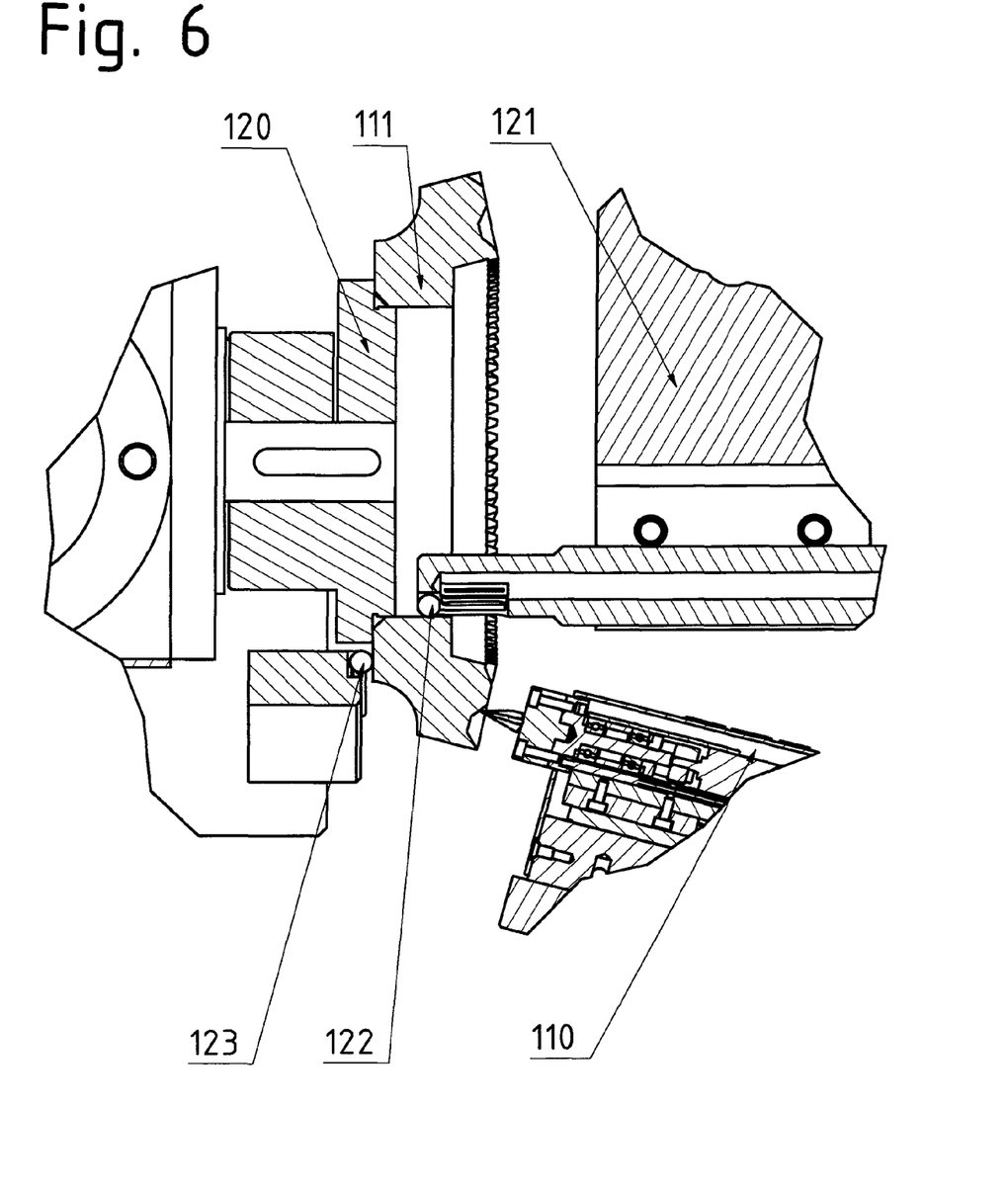
FIG. 6 shows a section through a device for measuring crown and bevel gears with, in each case, a concentric and lateral probe as reference probe in the measurement position.
Figure 7:
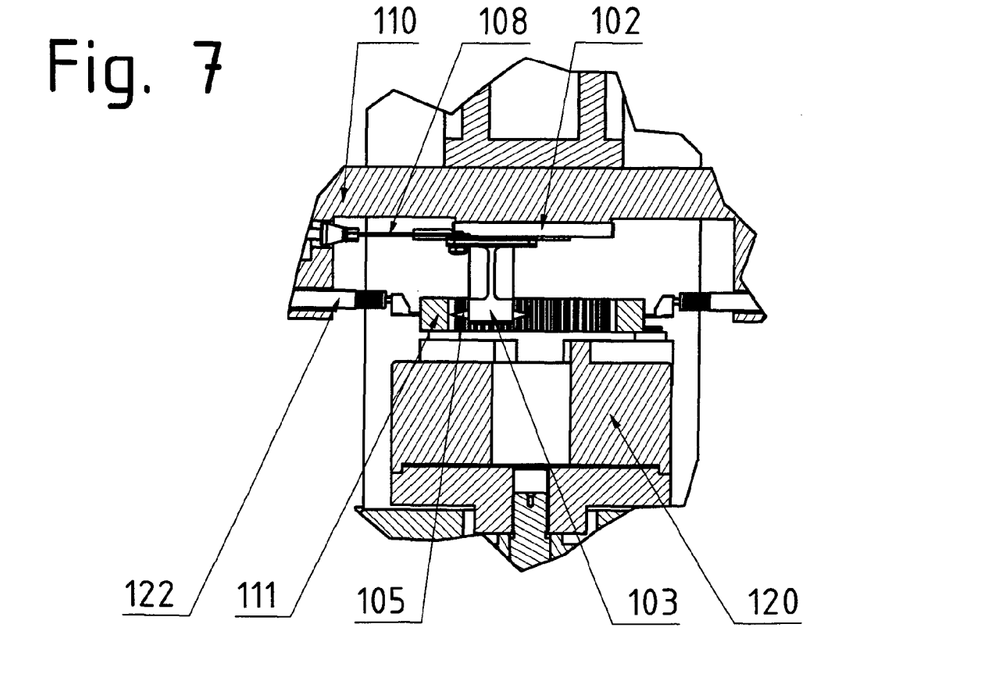
FIG. 7 shows a section through a measuring device for ring gears.

In order to be able to monitor the concentricity or the planarity and also the parallelism of a toothing on the basis of a reference axis or a reference plane, the possibility exists of detecting the reference axis or the reference plane metrologically, for example by means of a probe, as illustrated in FIG. 6, in order to be able to include it in the later mathematical evaluation. For this purpose it is proposed according to the invention that in the case of workpiece 111 in the form of a gear this is only gripped on a limited length, of for example 2 to 3 mm, in order to to be able to measure or monitor the concentricity of the bore over the remaining length. In this way a simple expanding mandrel or a collet chuck, which is designed to correspond to the workpiece to be received, can be used as gripping element.

Figure 5:
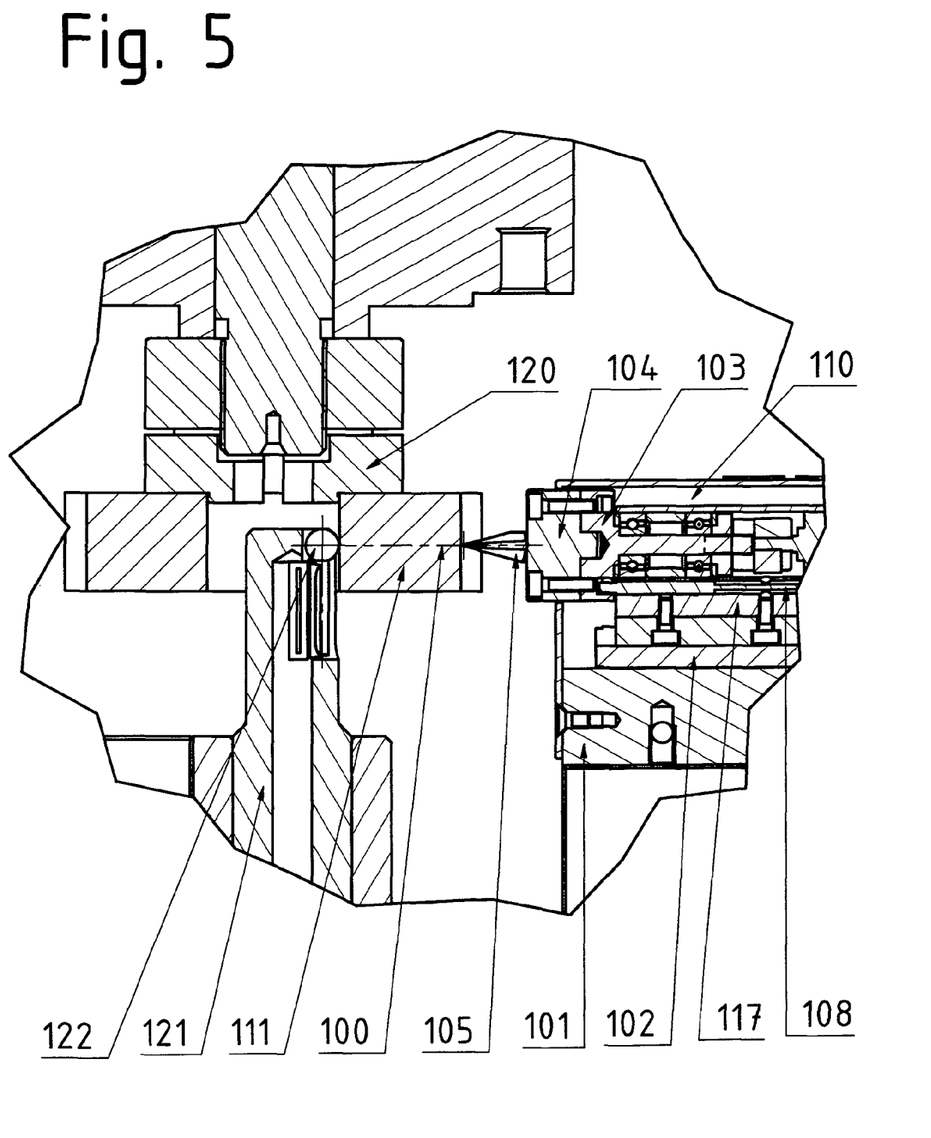
FIG. 5 shows a section through a device for measuring gears with a concentric probe as reference probe in the measurement position.

FIG. 5 shows one such embodiment as a detail, wherein the measuring units 110 which measure the toothing profile and the measuring devices 121 which monitor the concentricity of the workpiece bore are movable parallel to the axis of the workpiece and are coupled in an advantageous manner so that the measurement of the toothing profile and of the diameter of the bore as reference profile always takes place in one plane.

However, the same also applies in the case of crown gears, bevel gears and similar workpieces 111, where the runout of the toothing to a workpiece surface is also often important. FIG. 6 shows a detail of such an embodiment with a workpiece 111 which is designed as a spiral toothed crown gear and of which the toothing is measured by means of the measuring unit 110 which is oriented obliquely corresponding to the toothing angle, whereas the concentricity of the workpiece holder can be detected by means of the probe 122 and the runout of the workpiece holder can be detected by means of the probe 123.

Alternatively it is proposed according to the invention that the measuring units 110 used for measurement of a gear are set up on a platform in the form of a compound slide table which is freely movable by means of linear guides in the x and y direction, and which is supported on the reference surface of the workpiece or the workpiece holder, so that the deviations from concentricity are already mechanically compensated thereby, as in the event of a deviation from concentricity the measuring units 110 carry out the resulting movement exactly and at the correct angle, so that the deviation from concentricity can remain unconsidered in the measured value evaluation.

Accordingly in the inspection of a profile strip or toothed rod the measuring units 110 can be mounted on a platform which is freely movable only in the x direction in order thus to be able to compensate the planarity or parallelism of a toothing by comparison with a reference surface in the same way.

Figure 8:
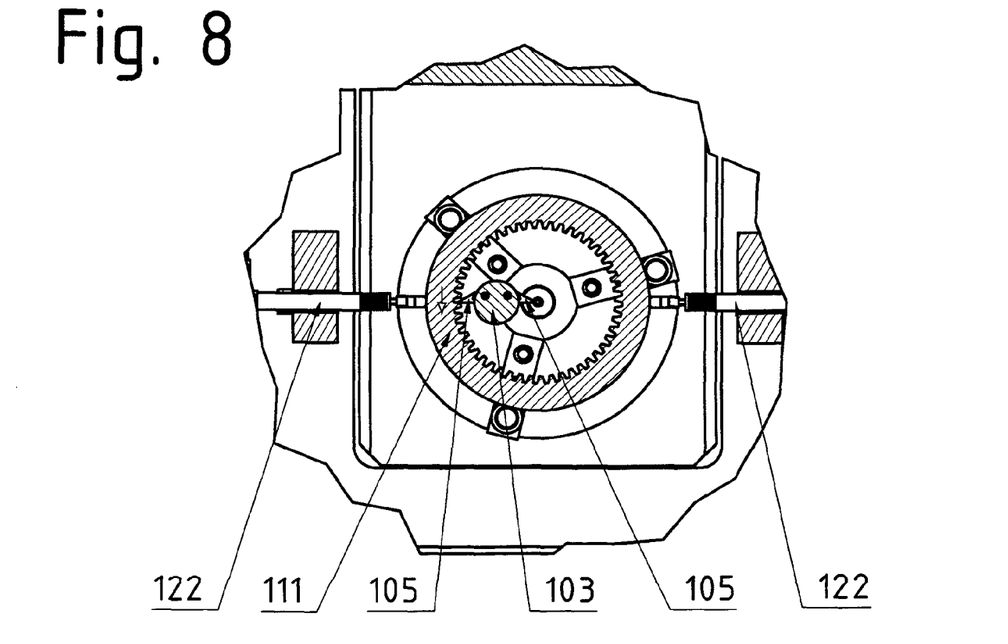
FIG. 8 shows a cross section through FIG. 8.

FIG. 8 shows as a detail a measuring device for ring gears, in which the workpiece 111, as already mentioned, is held by a collet chuck, above which a special axially movable measuring unit 110 is disposed. This measuring unit 110 also has virtually the same components as the previously described measuring units, only in this embodiment they are arranged differently and the distance piece 103 also performs the task of the probe element support 104 which is omitted here, as this distance piece is equipped with two probe elements 105 which are designed as conical probe pins and are disposed in mirror image relative to one another. The distance piece 103 is connected to the linear guide 102 and by means of the spring rod 108 to the probe pin 107 of the profile probe 106. The main body 101 of the measuring unit 110 which is modified for this additionally has a respective mounting for each of two concentric probes 122 which sense the external diameter of the workpiece 111. Thus it is possible also to detect the toothing of the ring gear in a plane with the concentricity on the external diameter of the gear.

The probe elements 103 can also be brought to bear alternately by actuation of the linear guide 102 depending upon the direction of rotation of the workpiece 111. However, it is also possible to bring the probe elements 105 to bear on the toothing by a slight oblique positioning or inclination of the device. A central safety catch (not shown here) can ensure that in the event of a change of inclination the distance piece 103 is kept in the centre of the device and is released again only after a change in the direction of rotation of the workpiece 111, in order to arrive in a corresponding measurement position.

Figure 9:
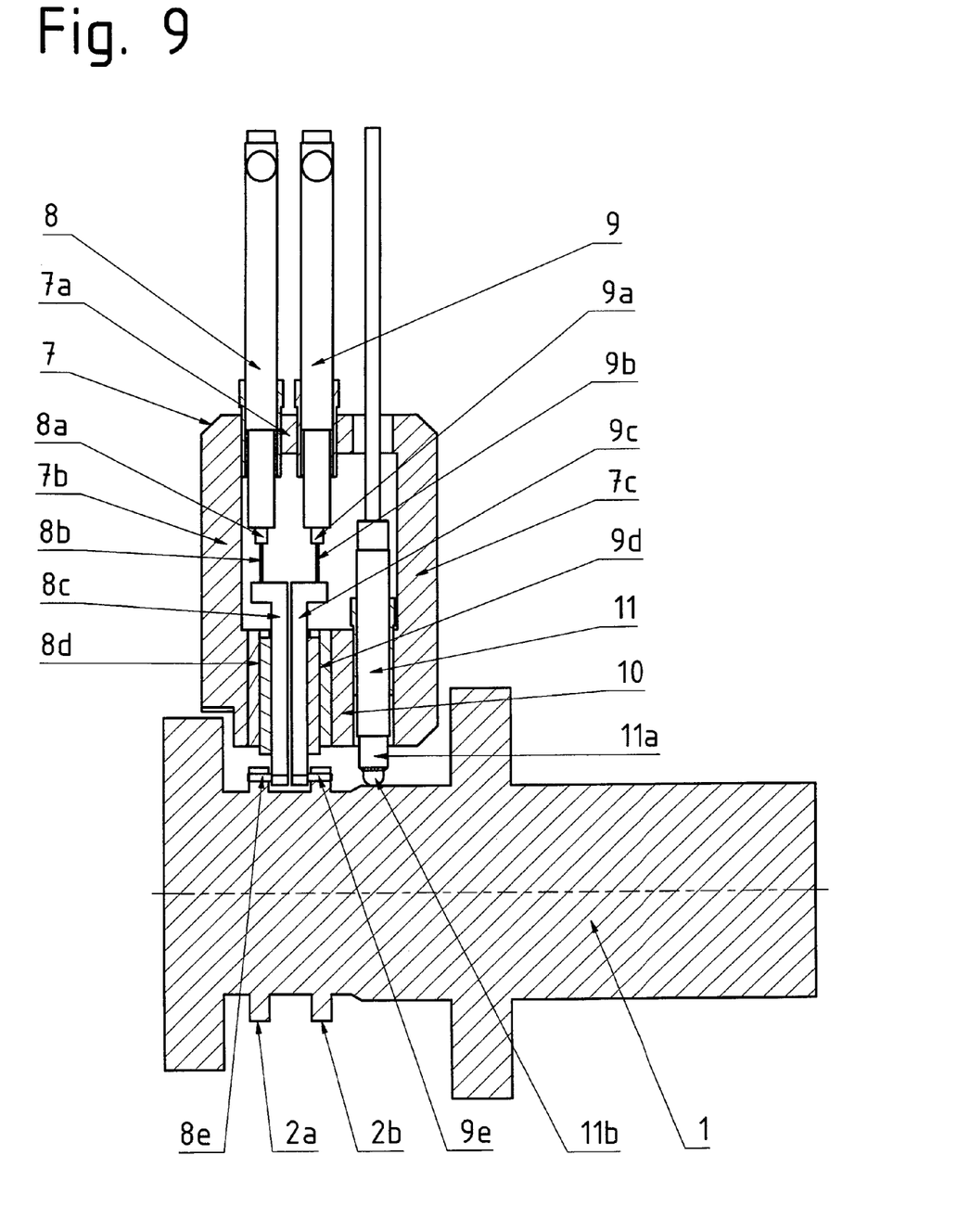
FIG. 9 shows a section through a device for monitoring a shaft with a duplex sprocket.

FIG. 9 shows a further device according to the invention which is suitable for measuring a shaft with a duplex sprocket. In this embodiment the measuring unit 7, 110 is designed as a double element, that is to say for simultaneous measurement of two toothings. It has an upper crosspiece 7a adjoined by two downwardly directed legs 7b and 7c. In this embodiment, from above two probes 8, 9 are inserted in a fixed position in the crosspiece 7a, and the probe pins 8a, 9a of these probes project downwards into the free space in the measuring unit 7. The lower free end of each probe pin 8a, 9a is adjoined by one end of a spring rod 8b, 9b having a relatively small cross section, whilst the other ends are each connected to a ram-like distance piece 8c, 9c projecting downwards out of the measuring unit 7. The ram-like distance pieces 8c, 9c are axially movably guided by means of linear guides 8d, 9d which are only indicated and which are preferably designed as slide guides supported by rolling elements and are attached to the legs 7b, 7c.

On its ends projecting out of the measuring unit 7 each distance piece 8c, 9c is equipped with a probe element 8e, 9e, which in this embodiment consists of a horizontally disposed pin which is preferably made of hard metal. These probe elements 8e, 9e project in each case out of the sides of the distance pieces 8e, 9e facing away from one another and can be placed onto the toothing profile of the gears 2a and 2b. In this illustration the probe elements 8e, 9e rest on the base of the tooth spaces in the gears 2a and 2b of the duplex sprocket 2. In this embodiment the leg 7c of the measuring unit 7 has on its lower end a preferably inwardly directed projection 10, in which a shaft probe 11 is used, of which the probe element 11b fastened on the end of its probe pin 11a rests against or on the shaft 1 as reference plane. The probe element 11a here is advantageously spherical and is preferably made of hard metal.

With a device according to the invention, however, it is also possible to dispose such measuring units 7, 110 obliquely with respect to a toothing, in order for example to inspect the toothing of a ring gear from the exterior by means of the probe element which can then be likewise in an oblique position. However, workpieces other than only toothed gears, toothed shafts or toothed rods can be inspected with these autonomous measuring units 7, 110 and for example their functioning can also be checked. For example the profile of the workpiece to be inspected may also be an internal or external thread.

LIST OF REFERENCE NUMERALS 1 shaft
2 toothing
2a gears
2b gears
4 stator
7 measuring unit
7a crosspiece
7b leg
7c leg
8 profile probe
8a probe pin
8b spring rod
8c distance piece
8d linear guide
9 profile probe
9a probe pin
9b spring rod
9c distance piece
9d linear guide
10 projection
11 shaft probe
11a probe pin
11b probe element
100 measuring axis
101 main body
102 linear guide
103 distance piece
104 probe element support
105 probe element
106 profile probe
107 probe pin
108 spring rod
109 toothing
110 measuring unit
111 workpiece
112 probe radius
113 rear edge
114 front edge
115 lateral surface
116 tooth space
117 housing
118 drive of the distance piece
119 ball as stop
120 workpiece holder
121 measuring arrangement
122 concentric probe
123 lateral probe

The invention claimed is:

1. Device for inspecting a profiled workpiece having a toothing, comprising a probe with a probe element which can be brought into a gap in the profile and a drive for a relative movement between workpiece and probe at right angles to the measuring plane, wherein the probe element has a probe radius which can be applied with a predeterminable probing force to the profile to be measured on the workpiece and of which the centre is oriented perpendicular to the axis of rotation of the workpiece, and said probe radius has at least one lateral surface which extends obliquely with respect to the measuring plane, faces the profile edge which moves relative to the probe element and can be displaced by said profile edge out of the profile gap against the probing force aligned with the axis of rotation of the workpiece.

2. Device according to claim 1, wherein the probe element is designed as a conical pin with a spherical tip.

3. Device according to either claim 1, wherein the probe element can be applied to the toothing by a spring and/or a weight and/or another medium with a predeterminable force.

4. Device according to claim 1, wherein the probe element can be connected to a distance piece which is formed on a linear guide and which can be joined by a spring rod to a probe pin of the profile probe, and in that the linear guide and the profile probe can be mounted on a main body in order to form an autonomous measuring unit.

5. Device according to claim 1, wherein the distance piece is rotatably mounted and is pivotable by a drive about +/−180°, wherein the distance piece can be coupled to the drive directly or by a coupling which compensates for slight movements in the axial direction.

6. Device according to claim 1, wherein between the lateral surface facing the front edge of the workpiece and the movement plane of the linear guide an angle of approximately 20 to 40° is enclosed, and the angle of the conical probe element is approximately 0 to 15° less than the angle between the lateral surface and the movement plane of the linear guide.

7. Device according to either claim 1, wherein at least one concentric probe and/or at least one lateral probe are associated directly or indirectly with the measuring unit, can be brought into the same plane with the measuring unit as required and can be moved together with the measuring unit parallel to the toothing.

8. Device according to claim 1, wherein the measuring units are mounted on a platform which is freely movable linearly or like a compound slide table and which can be supported on a reference surface of the workpiece or on a reference surface of the workpiece holder.

9. Device according to claim 1, wherein a plurality of measuring units are distributed so that the measuring units are directed towards the toothing according to preselectable measuring planes at different distances from one another.

10. Device according to claim 1, wherein an angle measuring device is associated on both sides with a workpiece received between two tips.

\* \* \* \* \*